(12) United States Patent
Patton et al.

(10) Patent No.: US 10,816,054 B2
(45) Date of Patent: *Oct. 27, 2020

(54) ENERGY ABSORBERS AND POSTS INCLUDING ENERGY ABSORBERS

(71) Applicant: Honeywell International Inc., Morris Plains, NJ (US)

(72) Inventors: Justin Shane Patton, Franklin, PA (US); Brian C. Montgomery, Mercer, PA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,587

(22) Filed: Jan. 14, 2020

(65) Prior Publication Data

US 2020/0149607 A1 May 14, 2020

Related U.S. Application Data

(63) Continuation of application No. 13/814,817, filed as application No. PCT/US2011/047158 on Aug. 10, 2011, now Pat. No. 10,578,178.

(Continued)

(51) Int. Cl.
*F16F 7/12* (2006.01)
*A62B 35/00* (2006.01)
(Continued)

(52) U.S. Cl.
CPC .......... *F16F 7/126* (2013.01); *A62B 35/0068* (2013.01); *A62B 35/04* (2013.01); *E04G 21/329* (2013.01); *F16F 7/12* (2013.01)

(58) Field of Classification Search
CPC .... F16F 7/12; F16F 7/121; F16F 7/123; F16F 7/126; F16F 7/128; E04G 21/3276;
(Continued)

(56) References Cited

U.S. PATENT DOCUMENTS 3,198,288 A * 8/1965 Presunka ............... B60R 22/28
188/377
4,402,113 A * 9/1983 Smith ..................... F16L 33/02
24/20 R
(Continued)

FOREIGN PATENT DOCUMENTS

DE 1944293 A1 * 4/1971 ............... F16F 7/12
DE 3900066 A1 3/1990
(Continued)

OTHER PUBLICATIONS

Communication pursuant to Rules 161(1) and 162 for European Application No. 11746099.8, dated Mar. 19, 2013, 2 pages.
(Continued)

*Primary Examiner* — Jonathan Liu
*Assistant Examiner* — Guang H Guan
(74) *Attorney, Agent, or Firm* — Alston & Bird LLP

(57) ABSTRACT

An energy absorber includes a monolithic length of ductile material comprising a first end and a second end. The material is formed to include at least a first longitudinally extending section that extends continuously between the ends, a first discontinuous section extending longitudinally from the first end toward the second end and at least a second discontinuous section extending longitudinally from the second end toward the first end. The first longitudinally extending section is deformed over at least a portion thereof out of a plane running through both ends. The first discontinuous section and the second discontinuous section are connected such that tensile force of a threshold magnitude is required between the ends to disconnect the first discontinuous section from the second discontinuous section, letting the first longitudinally extending section free to deform under tensile force and extend in longitudinal direction.

18 Claims, 8 Drawing Sheets

Related U.S. Application Data

(60) Provisional application No. 61/372,643, filed on Aug. 11, 2010.

(51) Int. Cl.
*A62B 35/04* (2006.01)
*E04G 21/32* (2006.01)

(58) Field of Classification Search
CPC .............. E04G 21/329; E04G 21/3295; A62B 35/0043; A62B 35/0068; A62B 35/04
USPC ...... 182/3, 45; 248/548, 900, 909, 237, 300, 248/417, 636, 499, 500, 505, 507; 40/602, 608, 607.04; 188/371, 376; 52/98
See application file for complete search history.

(56) References Cited

U.S. PATENT DOCUMENTS

| | | | | |
|---|---|---|---|---|
| 5,143,187 | A * | 9/1992 | McQuarrie | A62B 35/0056 182/3 |
| 5,177,861 | A | 1/1993 | Sawdon | |
| 5,267,383 | A | 12/1993 | Sawdon | |
| 5,332,071 | A * | 7/1994 | Duncan | A62B 35/04 188/371 |
| 5,433,290 | A * | 7/1995 | Ellis | A62B 35/04 182/3 |
| 5,799,760 | A * | 9/1998 | Small | A62B 35/04 182/3 |
| 5,927,666 | A * | 7/1999 | Barkan | A47B 96/061 248/225.11 |
| 6,279,680 | B1 * | 8/2001 | Casebolt | A62B 35/0087 182/18 |
| 7,694,399 | B2 | 4/2010 | Sawdon et al. | |
| 10,578,178 | B2 * | 3/2020 | Patton | A62B 35/04 |
| 2008/0251320 | A1 * | 10/2008 | Lara | A62B 35/04 182/192 |
| 2008/0252553 | A1 * | 10/2008 | Leadley-Brown | H01Q 1/12 343/878 |
| 2009/0173867 | A1 * | 7/2009 | Auger | F16M 11/10 248/548 |
| 2013/0168528 | A1 | 7/2013 | Patton et al. | |

FOREIGN PATENT DOCUMENTS

| | | |
|---|---|---|
| JP | 2000-202053 A | 7/2000 |
| WO | 2003/037700 A1 | 5/2003 |
| WO | 03/47700 A1 | 6/2003 |
| WO | 2010/000035 A1 | 1/2010 |

OTHER PUBLICATIONS

Decision to Grant for European Application No. 11746099.8, dated Oct. 8, 2015, 2 pages.
Final Rejection dated Apr. 21, 2017 for U.S. Appl. No. 13/814,817.
Final Rejection dated Jul. 8, 2015 for U.S. Appl. No. 13/814,817.
Intention to Grant for European Application No. 11746099.8, dated Jul. 30, 2015, 6 pages.
International Preliminary Report on Patentability and Written Opinion dated Feb. 21, 2013.
International Search Report and Written Opinion for Application No. PCT/US2011/047158, dated Jul. 9, 2012.
Non-Final Rejection dated Dec. 11, 2014 for U.S. Appl. No. 13/814,817.
Non-Final Rejection dated Sep. 22, 2016 for U.S. Appl. No. 13/814,817.
Notice of Allowance and Fees Due (PTOL-85) dated Oct. 15, 2019 for U.S. Appl. No. 13/814,817.

* cited by examiner

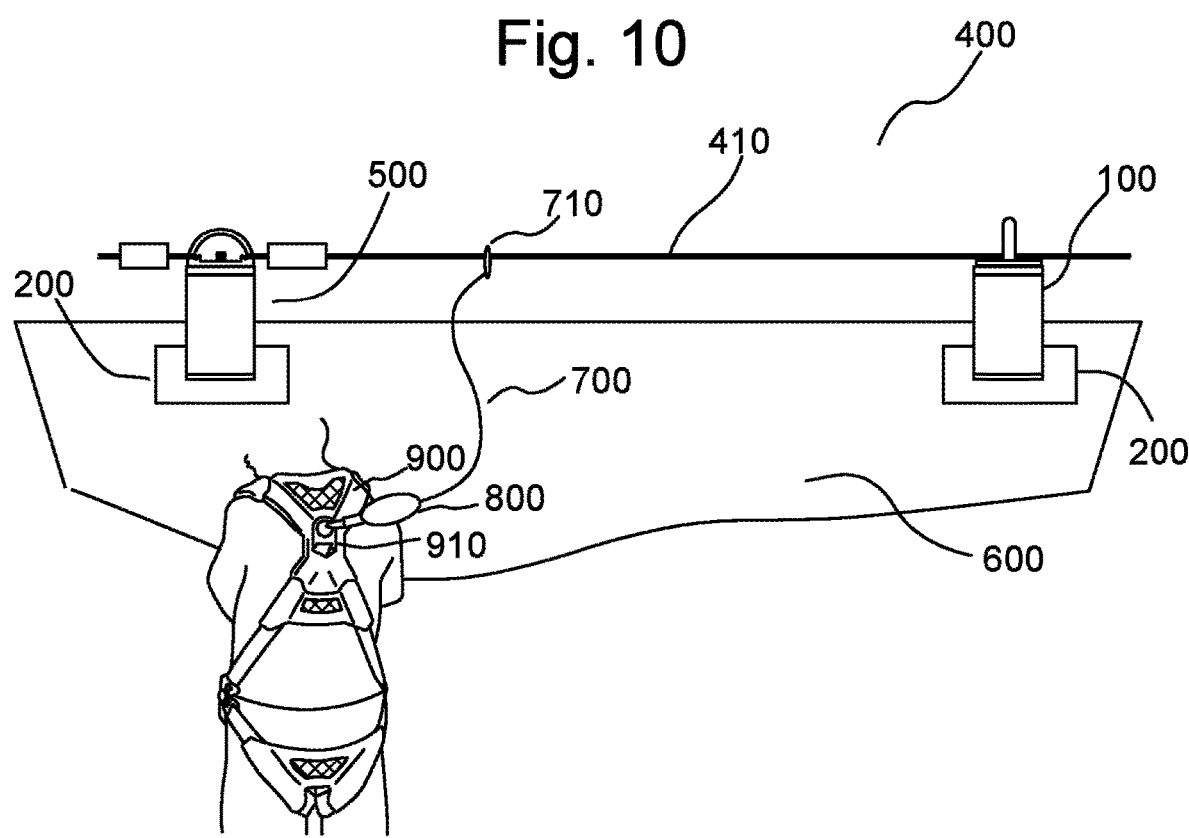

US 10,816,054 B2

ENERGY ABSORBERS AND POSTS INCLUDING ENERGY ABSORBERS

CROSS-REFERENCE TO RELATED APPLICATIONS

This application is a Continuation of U.S. Non-Provisional patent application Ser. No. 13/814,817, filed Mar. 20, 2013 and titled "Energy Absorbers and Posts Including Energy Absorbers," which is a National Stage Entry of International Patent Application Serial No. PCT/US2011/047158, filed Aug. 10, 2011, which claims priority to and the benefit of the filing date of U.S. Provisional Patent Application Ser. No. 61/372,643, filed Aug. 11, 2010, the disclosures of each of which are hereby incorporated herein by reference in their entireties for all purposes.

BACKGROUND

The following information is provided to assist the reader to understand the technology described below and certain environments in which such technology can be used. The terms used herein are not intended to be limited to any particular narrow interpretation unless clearly stated otherwise in this document. References set forth herein may facilitate understanding of the technology or the background thereof. The disclosure of all references cited herein are incorporated by reference.

Shock absorbing devices and system are used in a variety of systems to, for example, protect structures, equipment and/or persons from experiences excessive force.

In the case of, for example, fall protection devices and system, shock absorbing devices can be used to protect anchorage points or structures, fall protection equipment and/or a user of the fall protection equipment. In the case of a worker on an elevated structure such as a roof, one or more shock absorbers can, for example, be used in connection with one or more posts that can be used individually as an anchorage or collectively in a horizontal lifeline system. Whether used individually or in a horizontal lifeline system, such posts raise a lifeline attached to a user above the roof structure (to, for example, facilitate use thereof), and can lead to relatively high torque or moment forces upon the roof structure in the case of a fall. To reduce the forces upon the roof or other structure, posts can be designed to "tilt" or "tip over" upon experiencing a force above a threshold force (for example, associated with a fall), thereby reducing torque and reducing or minimizing damage to the roof or other structure. An energy absorbing system can also be use in connection with such a post to further limit forces upon the roof or other structure as well as to reduce force experienced by the user.

SUMMARY

In one aspect, an energy absorber or an energy absorbing connector includes a monolithic length of ductile material comprising a first end and a second end. The material is formed (for example, cut, bent etc.) to include at least a first longitudinally extending section that extends continuously between the first end and the second end (although not necessarily linearly therebetween). The first longitudinally extending section is deformed over at least a portion thereof, for example, out of a plane running through the first end and the second end. The length of material is further formed to include a first discontinuous section extending longitudinally (although not necessarily linearly) from the first end toward the second end and at least a second discontinuous section extending longitudinally (although not necessarily linearly) from the second end toward the first end. The first discontinuous section and the second discontinuous section are connected such that tensile force of a threshold magnitude is required between the first end and the second end to disconnect the first discontinuous section from the second discontinuous section. Upon disconnection of the first discontinuous section from the second discontinuous section, the first longitudinally extending section is free to deform under tensile force (and extend in longitudinal direction) to absorb energy.

The energy absorber can, for example, further include a second longitudinally extending section that extends continuously between the first end and the second end. The second longitudinally extending section is deformed out of the plane running through the first end and the second end. The first discontinuous section and the second discontinuous section can, for example, be positioned between the first longitudinally extending section and the second longitudinally extending section.

The first discontinuous section and the second discontinuous section can, for example, be connected by at least one shear pin.

In another aspect, a post system for use in fall protection, includes: an extending post member, a first end member (150) in operative connection with a first end of the extending post member; a second end member in operative connection with a second end of the extending post member; a first connector in operative connection with the first end member (150) to connect a lifeline system to the first connector; a second connector in operative connection with the second end member to connect the second end member to a structure; and at least one energy absorber or energy absorbing connector in operative connection between the first end member (150) and the second end member.

The energy absorber or energy absorbing connector includes a monolithic length of ductile material including a first end and a second end. The length of material is formed to include at least a first longitudinally extending section that extends continuously between the first end and the second end. The first longitudinally extending section is deformed over at least a portion thereof, for example, out of a plane running through the first end and the second end. The length of material is further formed to include a first discontinuous section extending longitudinally from the first end toward the second end and at least a second discontinuous section extending longitudinally from the second end toward the first end. The first discontinuous section and the second discontinuous section are connected such that tensile force of a threshold magnitude is required between the first end and the second end to disconnect the first discontinuous section from the second discontinuous section. Upon disconnection of the first discontinuous section from the second discontinuous section, the extending post member is able to tilt relative to the second end member, and the first longitudinally extending section is free to deform under tensile force to absorb energy.

In a further aspect, a method of forming an energy absorber or an energy absorbing connector from a monolithic length of a ductile material including a first end and a second end, includes: forming the length of material to include at least a first longitudinally extending section that extends continuously between the first end and the second end, a first discontinuous section extending longitudinally from the first end toward the second end, and at least a second discontinuous section extending longitudinally from the second end toward the first end, deforming the first longitudinally extending section over at least a portion thereof, for example, out of a plane running through the first end and the second end, and connecting the first discontinuous section and the second discontinuous section such that tensile force of a threshold magnitude is required between the first end and the second end to disconnect the first discontinuous section from the second discontinuous section, upon disconnection of the first discontinuous section from the second discontinuous section, the first longitudinally extending section being free to deform under tensile force to absorb energy.

The technology described herein, along with the attributes and attendant advantages thereof, will best be appreciated and understood in view of the following detailed description taken in conjunction with the accompanying drawings.

BRIEF DESCRIPTION OF THE DRAWINGS

FIG. 10 illustrates the post system of FIG. 6 in use as an intermediate post in a horizontal lifeline system.

DETAILED DESCRIPTION

As used herein and in the appended claims, the singular forms "a," "an", and "the" include plural references unless the content clearly dictates otherwise. Thus, for example, reference to "a section" includes a plurality of such sections and equivalents thereof known to those skilled in the art, and so forth, and reference to "the section" is a reference to one or more such sections and equivalents thereof known to those skilled in the art, and so forth.

Several representative embodiments of energy or shock absorbers or energy absorbing connectors are discussed herein in connection with use thereof in a fall protection systems such as in connection with an extending anchorage member or system (sometimes referred to herein as a post or post system), which are attached to and extend above a structure such as a roof. Such extending anchorage members or posts can be used individually as an independent anchorage or collectively as a component of a horizontal lifeline systems. However, one skilled in the art appreciates that the energy absorbers described herein can be used in a wide variety of systems in which energy absorption in required to, for example, protect against damage to a structure or to equipment and/or to protect against injury to individuals. The energy absorbers described herein are, for example, particularly useful in situations in which energy absorption is to begin only after a threshold force is experienced by the energy absorber.

The energy absorbers of the present invention can, for example, be used as a cable tension limiter in a horizontal lifeline system. In use in fall protection systems such as horizontal lifeline systems, the primary functions of the energy absorbers of the present invention are to dissipate energy and to limit deceleration forces which are imposed on a body during fail arrest.

In several embodiments, energy absorbers hereof are formed from an extending section, strip or strap of a ductile or deformable material (for example, a metal) including at least one section that is deformed and/or torn when under tension. FIGS. 1 through 5 illustrate an energy absorber 10 including a strap 20 (for example, a metal strap). In several embodiments, strap 20 was fabricated from stainless steel and was approximately 8 inches long, 2¼ inches wide, and ⅛" of an inch thick. Strap 20 extends lengthwise between a first end 20a and a second end 20b.

Figure 1:
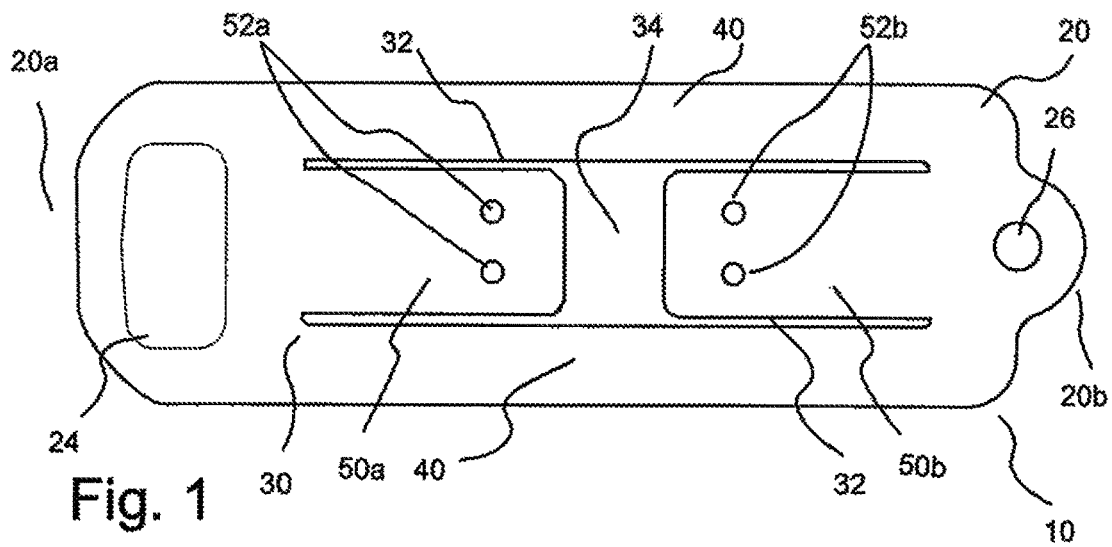
FIG. 1 illustrates a top plan view of a strip of metal cut to form an embodiment of an energy absorber.

In several embodiments, strap 20 was cut and subsequently bent or deformed in a manner such that at least one section thereof was deformed over at least a portion thereof, for example, out of the plane of the remainder of strap 20 and at least opposing sections could be connected to form a trigger mechanism. As illustrated in FIG. 1, in several embodiments, a generally H-shaped cut 30 (for example, via a laser-cutting technique or other cutting technique) was formed in monolithic metal strap 20. In that regard, H-shaped cut 30 included two generally longitudinally extending cuts or slots 32 passing through the width of strap 20 and a single generally laterally extending cut, slot or gap 34 through with width of strap 20. In the illustrated embodiment, slots 32 were relatively narrow, while slot 34 was wider in comparison. H-shaped cut 30 creates sections 40 on each lateral side of strap 20 which extend continuously or unbroken in a longitudinal direction between first end 20*a* and second end 20*b*. H-shaped cut 30 also creates two sections 50*a* and 50*b* positioned adjacent to and between sections 40 (separated by longitudinally extending slots 32). Section 50*a* extends longitudinally from first end 20*a* toward second end 20*b*, while section 50*b* extends longitudinally from second end 20*b* toward first end 20*a*. As illustrated in FIG. 1, before deformation, first section 50*a* and second section 50*b* are separated by slot or gap 34.

Figure 2:
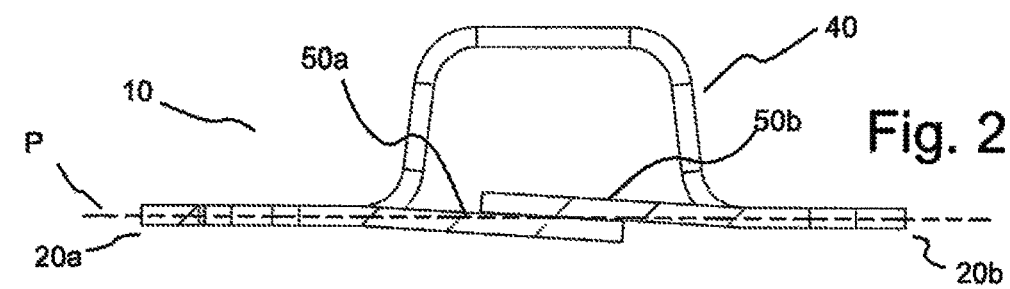
FIG. 2 illustrates a side view of the strip of metal of FIG. 1 formed or bent to form the embodiment of the energy absorber.
Figure 3:
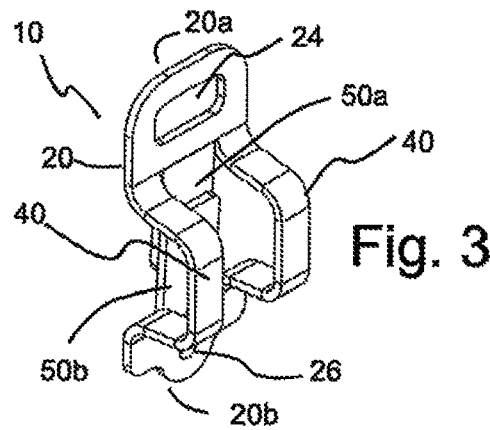
FIG. 3 illustrates a perspective view of the energy absorber of FIG. 2.
Figure 4:
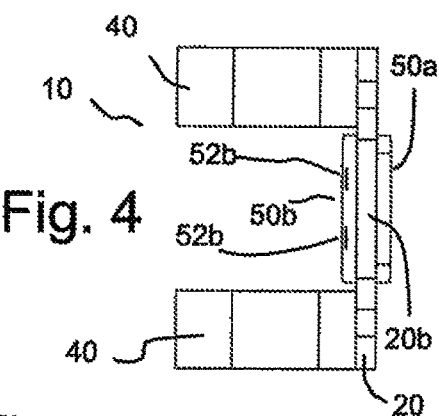
FIG. 4 illustrates an end view of the energy absorber of FIG. 2.
Figure 5:
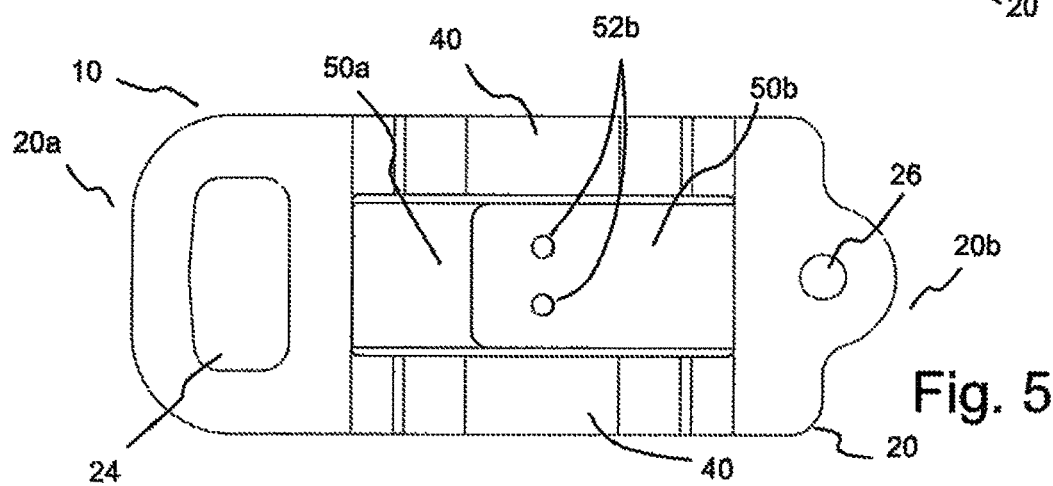
FIG. 5 illustrates a top plan view of the energy absorber of FIG. 2.

After forming H-shaped cut 30 in strap 20, a portion of each of sections 40 is deformed as, for example, illustrated in FIGS. 2 and 3. The deformation of sections 40 out of a plane P (see FIG. 2) passing through first end 20*a* and second end 20*b* brings section 50*a* and section 50*b* closer together so that then can be connected. In the representative embodiment illustrated, for example, in FIGS. 1-5, sections 40 are deformed sufficiently such that section 50*a* and section 50*b* overlap. At least one of or both of sections 50*a* and 50*b* can be deformed over at least a portion thereof slightly out of plane P running through first end 20*a* and second end 20*b* so that sections 50*a* and 50*b* can pass over each other and such that at least a portion of each section is in an adjacent, overlapping position relative to the other section.

Figure 6:
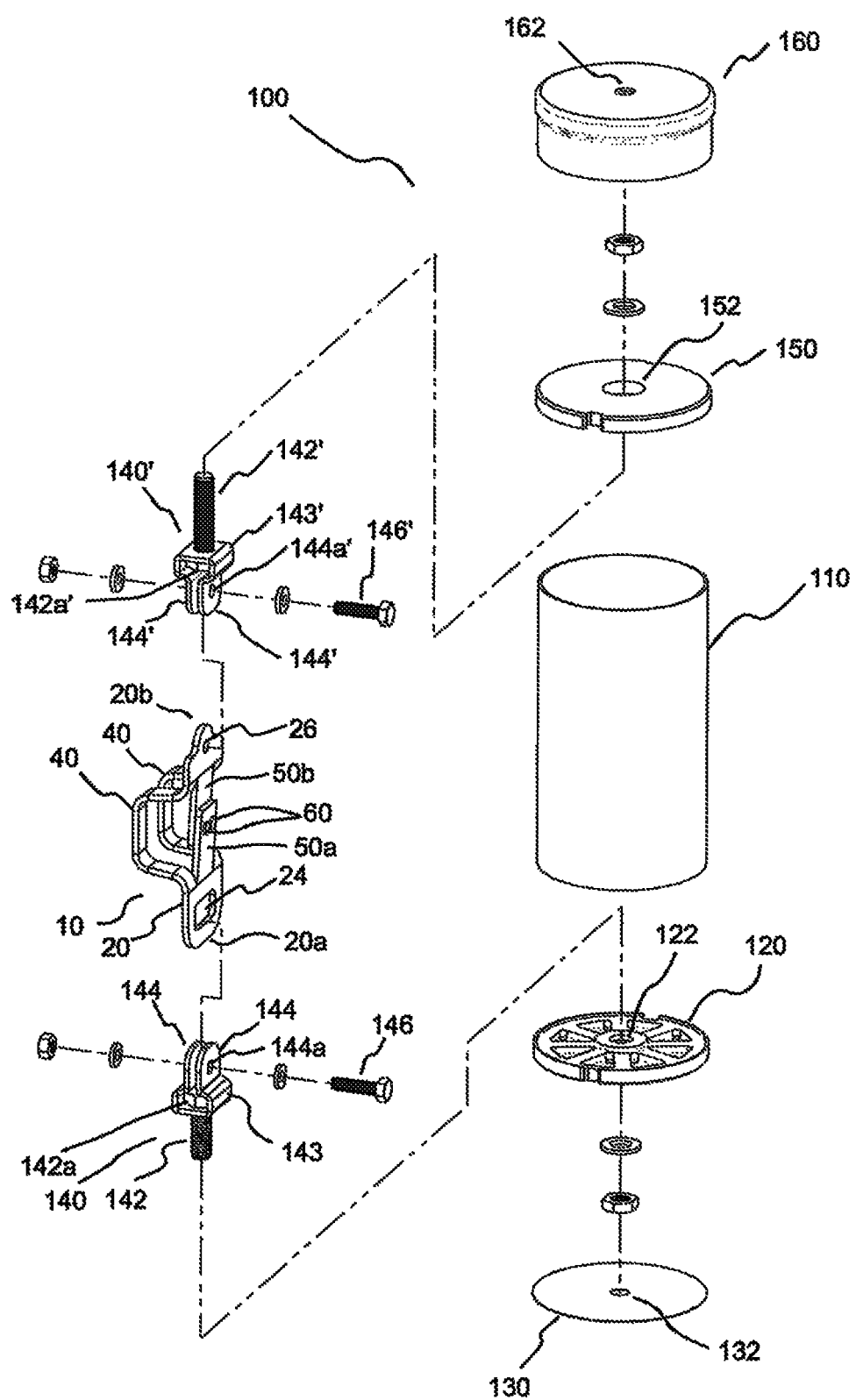
FIG. 6 illustrates a perspective view of an embodiment of an extending anchor member of post system including the energy absorber of FIG. 2 wherein shear members or pins have been added to the energy absorber.

In a number of embodiments, section 50*a* included at least one passage 52*a* therethrough, and section 50*b* including at least one passage 52*b* therethrough. Passage 52*a* and passage 52*b* can be aligned in the deformation process (wherein, section 50*a* and section 50*b* overlap each other) to pass a connector 60 (see, for example, FIG. 6) therethrough. Connector 60 (for example, a shear pin) can, for example, be chosen such that it breaks or shears under a threshold tensile force applied to energy absorber 10. In the embodiment illustrated in FIGS. 1 through 5, section 50*a* included two passages 52*a* and section 50*b* included two cooperating passages 52*b*. As illustrated in FIG. 6, a connector or shear pin 60 can be connected through each set of passages.

Energy absorber 10 further includes a first connector in the vicinity of first end 20*a* and a second connector in the vicinity of second end 20*b*. In the illustrated embodiment, the first connector includes a passage 24 formed in the vicinity of first end 20*a*, and the second connector includes a passage 26 formed in the vicinity of second end 20*b*. Each of passage 24 and passage 26 can cooperate with a corresponding cooperating connector to connect energy absorber or energy absorbing connector 10 into a system whereby tensile loads can, for example, be experienced through plane P. Upon experiencing a tensile load above a threshold level, the connection between section 50*a* and section 50*b* is broken (for example, via shearing of shear pins 60). Upon disconnection of section 50*a* and 50*b* as described above, sections 50*a* and 50*b* are free to move longitudinally away from each other. Upon disconnection of section 50*a* from section 50*b*, tensile force results in deformation (straightening) of sections 40 toward their original or undeformed state, which results in increasing the effective length of energy absorber 10 and absorbing of energy during such deformation. Upon application of a sufficient tensile force, energy absorber 10 deforms to return strap 20 to the conformation depicted in FIG. 1.

In a number of representative embodiments, energy absorber 10 was incorporated in an extending anchorage or post system 100 as illustrated, for example, in FIGS. 6 through 9C. Post system 100 includes a generally cylindrical extending or post member 110. On the bottom of post member 110, a post is seated upon an end member 120 and a bottom seal member 130. Each of end member 120 and seal member 130 include a generally central passage 122 and 132 respectively, through which a threaded connector 142 (for example, a bolt) of a first clevis assembly 140 passes to connect to a base 200 (see FIG. 8). In several embodiments, seal member 130 was formed from a polymeric material such as high density polyethylene (HDPE) and functioned to seal post system 100 and as a protective gasket to protect an upper surface of base 200 from damage. Base 200 can be attached to a structure via, for example, bolts 210, which can cooperate directly with the structure or with intermediate connectors such as clamp member or connector for attachment to the structure (for example, a roof).

First clevis assembly 140 includes a connector 143 including a pair of extending connective members 144, each of which includes a passage 144*a* therethrough. Connector 143 can, for example, be rotatably or otherwise retained on threaded connector 142 via an upper flange 142*a* (for example, a bolt head). First end 20*a* of energy absorber 10 passes between extending connective members 144 so that a connector such as a bolt 146 can be passed through passages 144*a* and passage 24 to connect energy absorber 10 to clevis assembly 140.

Post system 100 further includes an upper end member 150 which rests upon an upper end of post member 110. An upper cap member 160 extends over upper end member 150 and a portion of post member 110. Each of upper end member 150 and upper cap member 160 includes a generally central passage 152 and 162, respectively, through which a threaded connector 142' (for example, a bolt) of a second clevis assembly 140' to, for example, connects to a lifeline connector 300 (see, for example, FIGS. 9A through 9C). Second clevis assembly 140' is identical to first clevis assembly 140 in the illustrated embodiment and like elements are numbered similarly to corresponding elements of first clevis assembly 140 with the addition of the designation "'" thereto. Second end 20*b* of energy absorber 10 passes between extending connective members 144' so that a connector such as a bolt 146' can be passed through passages 144*a*' and passage 26 to connect energy absorber 10 to second clevis assembly 140'.

Because energy absorber 10 will not actuate until a threshold tensile force is experienced by energy absorber 10, post system 100 can be pretensioned or preloaded during attachment to base 200 to ensure secure attachment and suitable operation. The threshold force can, for example, be selected using known engineering principles to ensure suitable pretensioning. Moreover, the threshold force is preferably chosen such that energy absorber 10 is not actuated during normal use (that is, that energy absorber 10 is actuated only in the case of a fall).

Figure 7:
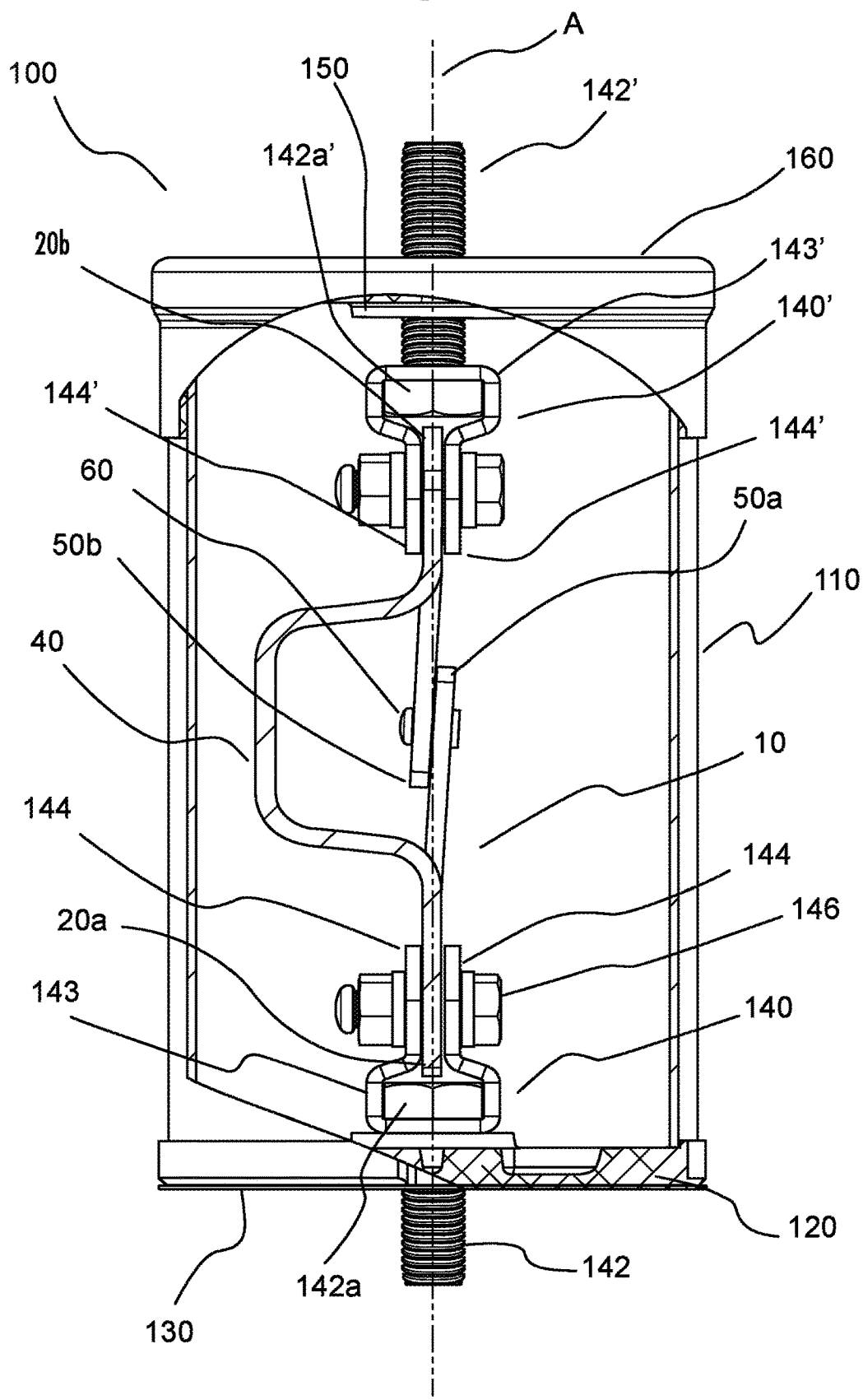
FIG. 7 illustrates a side, partially cutaway view of the post system of FIG. 6 in an assembled state.
Figure 8:
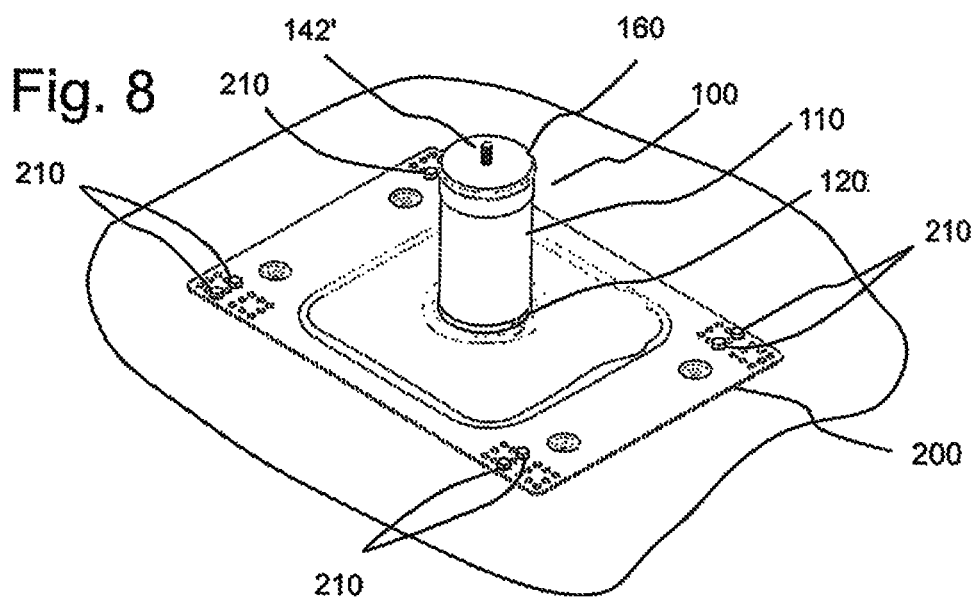
FIG. 8 illustrates the post system of FIG. 6 attached to an attachment plate or base, which is attached to an elevated structure such as a roof

As, for example, illustrated in FIG. 7, in a number of embodiments, a center axis A of post system 100 coincides generally with plane P of energy absorber 10, passing through shear pin 60. A force applied to lifeline connector 300 (see, for example, FIGS. 9A through 9C) from any direction is transferred through axis A and though energy absorber 10, wherein the amplitude of the force transferred through axis a is independent of the direction of the force.

Figure 9A:
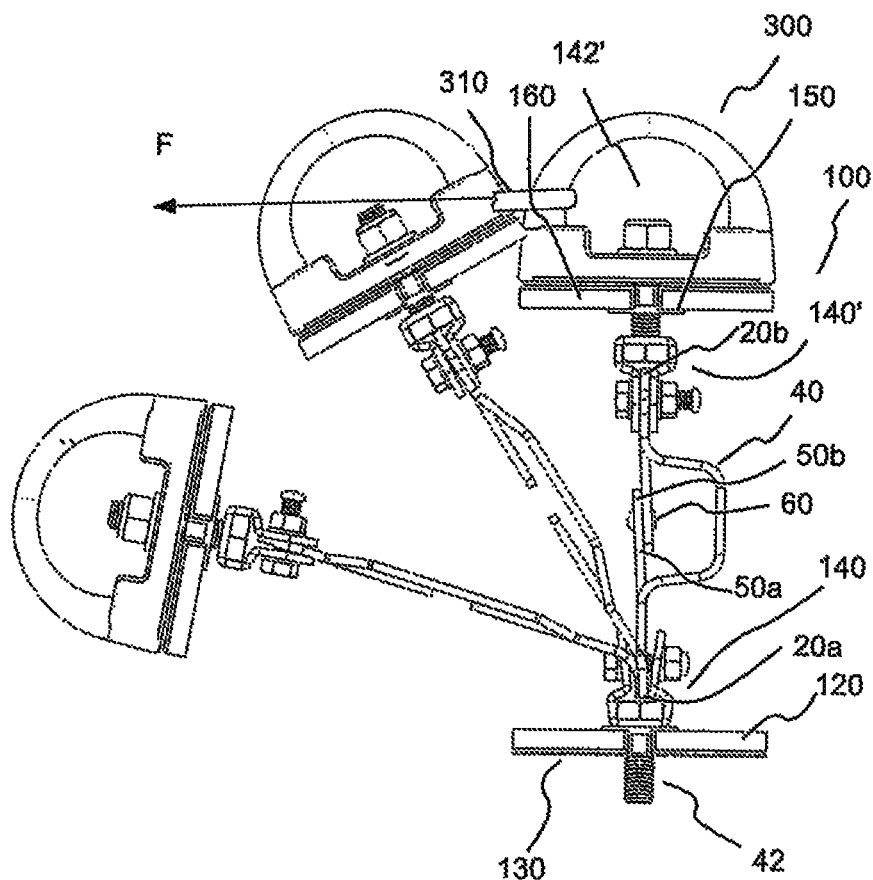
FIG. 9A illustrates a side view of the post system of FIG. 6 (with the post member removed for visualization of components internal thereto) just prior to experiencing a threshold load associated with a fall, after experiencing a threshold force wherein the shear pins of the energy absorber have been sheared and the upward extending portion of the post is tilting or tipping relative to the lower portion of the post which is attached to the structure, and after nearly completely tilting or tipping over.

FIG. 9A illustrates a side view of post system 100 with post member 110 removed just prior to experiencing a threshold load represented by arrow F associated with a fall (right), after experiencing such a force (center or intermediate) and after nearly completely tipping over or tilting (left). Arrow F can, for example, represent force applied by a user's lifeline connected to lifeline connector 300 by an attachment mechanism 310 such as a snap hook. In the center or intermediate portion of FIG. 9A and in FIG. 9B, post system 100 has experienced threshold force F, which has caused connectors or shear pins 60 of energy absorber 10 to be sheared. Section 50a and section 50b have become disconnected and sections 40 have begun to straighten (moving toward plane P, which coincides approximately with axis A of post system 100), effectively lengthening energy absorber 10 while absorbing energy. The lengthening of energy absorber 10 allows the upper portion of post system 100 to tilt or tip relative to the lower portion of the post (that is, relative to sealing member 130 and lower end member 120), which is attached to a structure via base 200. The left portion of FIG. 9A and in FIG. 9C illustrates post system 100 after nearly completely tilting or tipping over. As described above, the tipping or tilting of the upper section (including post member 110, upper end member 150, upper cap member 160 and lifeline connector 300) of post system 100 reduces the torque experienced by the structure, assisting in preventing damage to the structure. In the illustrated embodiment, extending connective members 144 of first or lower clevis assembly 140 deform upon tipping of the upper section of post system 100.

Continuously extending sections 40 maintain the connection between first clevis assembly 140 and second clevis assembly 140'. The materials, dimensions (for example, lengths, widths, thickness) and manner of deformation of connector 10 are readily selected using known engineering principles to provide, for example, a suitable ultimate load (that is, the load at failure; for example, at least 4000 pounds or at least 5000 pounds), a suitable extension length and a suitable energy absorption profile and/or amplitude.

Figure 9B:
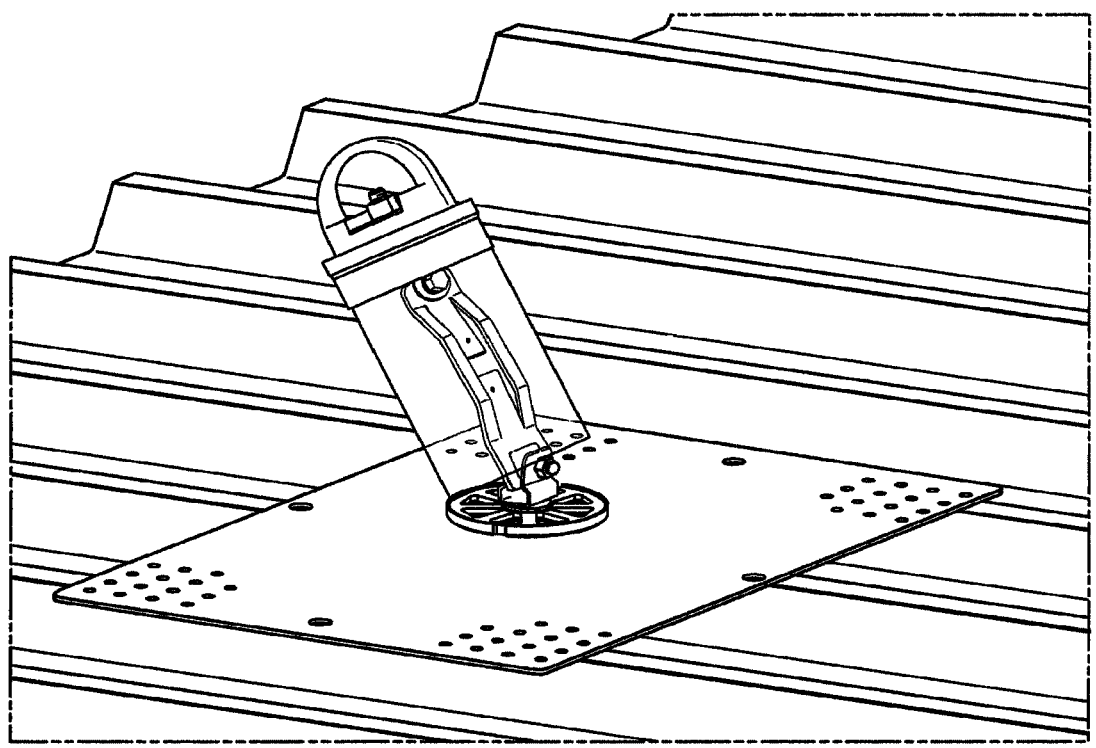
FIG. 9B illustrates a perspective, partially transparent view of the post system of FIG. 6 after experiencing a threshold force wherein the shear pins of the energy absorber have been sheared and the upward extending portion of the post is tilting or tipping relative to the lower portion of the post, which is attached to the structure.
Figure 9C:
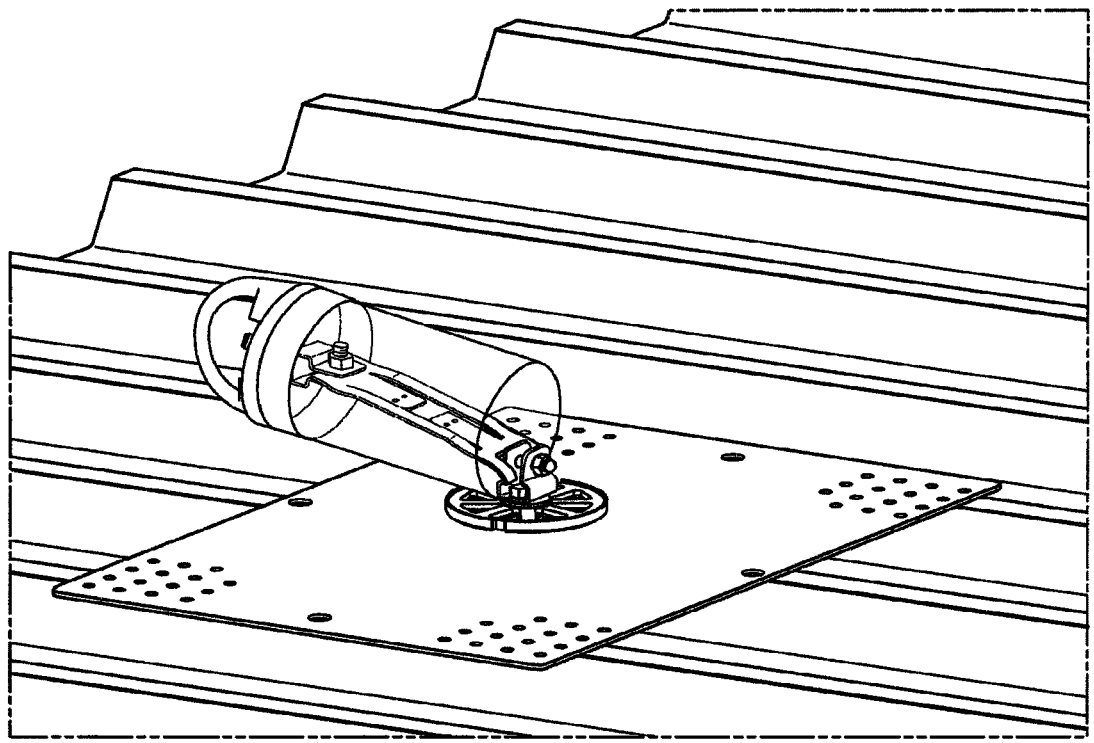
FIG. 9C illustrates a perspective, partially transparent view of the post system of FIG. 6 after nearly completely tilting or tipping over.

FIGS. 9A through 9C are representative of use of post system 100 as a point or stand-alone anchorage for use in connection with a user's lifeline. FIG. 10 illustrates the use of post system 100 as an intermediate post in a horizontal lifeline system 400, which includes a generally horizontally extending lifeline 410. In the illustrated embodiment, a portion of horizontal lifeline system 400 is illustrated including an end post system 500. Each of end post system 500 and post system 100 are attached to a roof structure 600 via base 200. A user is illustrated connected to horizontal lifeline 410 via a lifeline 700 including a connector 710 at a distal end for connection to horizontal lifeline 410. A proximal end of lifeline 700 can, for example, be connected to a self-retracting lifeline system 800 as known in the fall protection arts. Self-retracting lifeline system 800 is connected to a connector such as a D-ring 910 of a safety harness 900 worn by the user.

Figure 11:
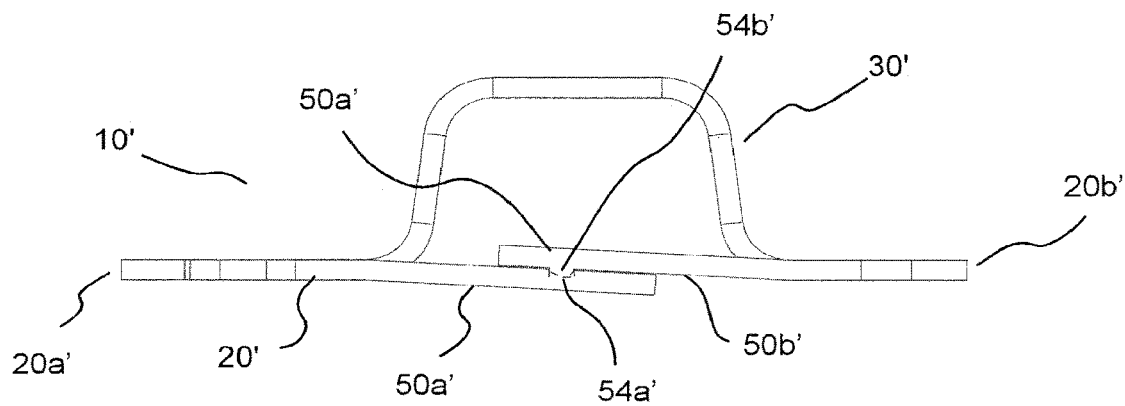
FIG. 11 illustrates the energy absorber of FIG. 2 wherein an activation trigger is formed by deforming portions of the energy absorbers to form an interlocking sections.

FIG. 11 illustrates another embodiment of an energy absorber 10', which is identical to energy absorber 10 other than the manner in which section 50a' and 50b are connected to create a threshold force to trigger or activate deformation of energy absorbing sections 40'. Like elements of energy absorber 10' are numbered similarly to corresponding elements of energy absorber 10 with the addition of the designation "'" thereto. In the illustrated representative embodiment of energy absorber 10', section 50a' and 50b' are connected using a cold-forming clinch process which uses a punch and die to form an interlocking joint within the metal of sections 50a' and 50b'. During the process, a generally rounded, button-shaped extension 54b' can, for example, be formed in section 50b' (the die side of the assembly), and a small generally cylindrical cavity 54a' can, for example, be formed in section 50a' (the punch side of the assembly). The formed interlocking joint is formed wholly in the metal of strap 20' and no external fasteners or welding is required. Forming an interlocking joint or connection between separate metal components is, for example, described in U.S. Pat. Nos. 7,694,399, 5,267,383 and 5,177, 861. As clear to one skilled in the art, however, sections 50a' and 50b' (as well as sections 50a and 50b) can be joined using any number of fasteners, connectors, and/or welding to provide an interlocking connection which breaks or disconnects at a threshold force (or within a range of forces).

Figure 12:
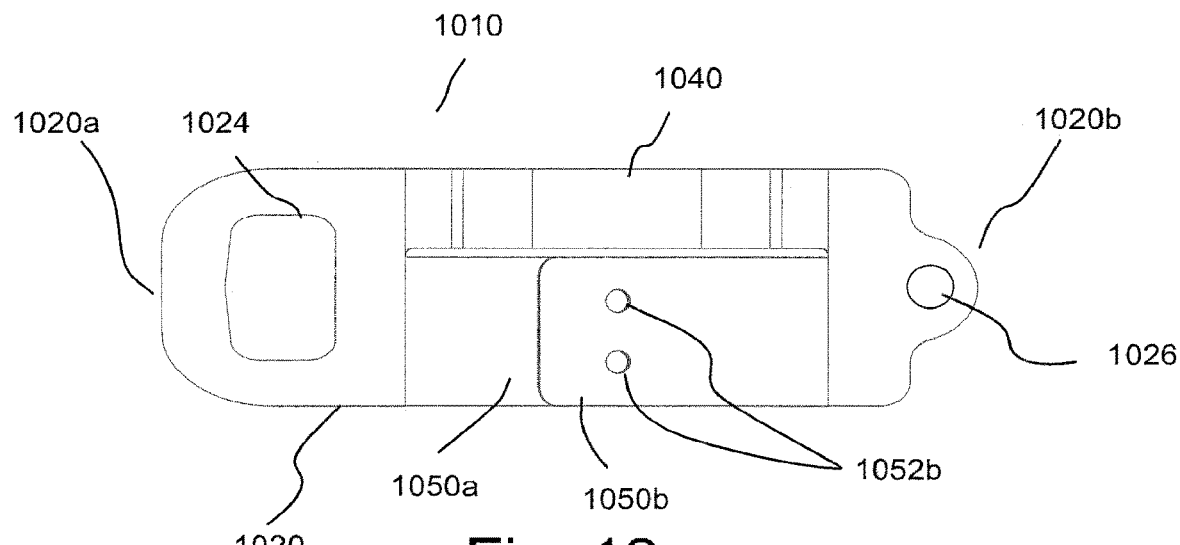
FIG. 12 illustrates a top plan view of another embodiment of an energy absorber.

The energy absorbers or energy absorbing connectors hereof can readily be formed (for example, monolithically) to have one or more continuously extending, deformable energy absorbing sections and one or more sets of interconnecting or interlocking (triggering or activating) sections. FIG. 12, for example, illustrates a representative embodiment of an energy absorber 1010 formed from monolithic strap or length of metal 1020 to include a single continuously extending (that is, continuously extending between ends 1020a and 1020b) deformed energy absorbing section 1040 and a single set of interconnected or interlocking sections 1050a and 1050b. Sections 1050a and 1050b can, for example, be connected via passages formed therein as described in connection with energy absorber 10. In FIG. 12, only passages 1052b of section 1050b are visible. Similar to energy absorber 10, energy absorber 1010 further includes a first connector in the vicinity of first end 1020a and a second connector in the vicinity of second end 1020b. In the illustrated embodiment, the first connector includes a passage 1024 formed in the vicinity of first end 1020a, and the second connector includes a passage 1026 formed in the vicinity of second end 1020b.

Figure 13:
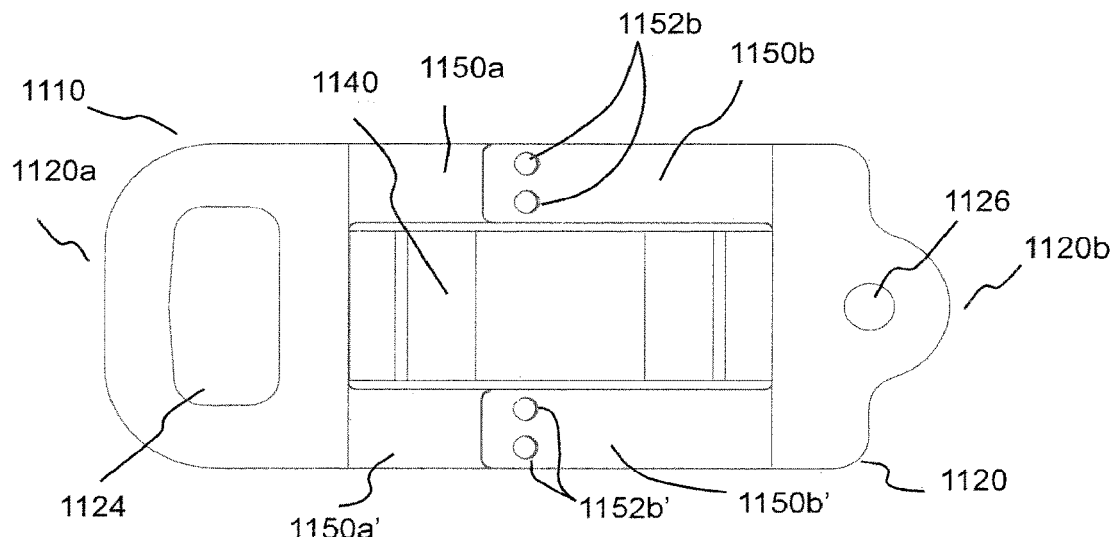
FIG. 13 illustrates a top plan view of another embodiment of an energy absorber.

FIG. 13 illustrates a representative embodiment of an energy absorber 1110 formed from monolithic strap or length of metal or other ductile material 1120 to include a single continuously extending, deformed energy absorbing section 1140, a first set of interconnected or interlocking sections 1150a and 1150b and a second set of interconnected or interlocking sections 1150a' and 1150b'. Sections 1150a and 1150b (and sections 1150a' and 1150b') can, for example, be connected via passages formed therein as described in connection with energy absorber 10. In FIG. 13, only passages 1152b of section 1050b and passages 1152b' of section 1150b' are visible. Similar to energy absorber 10, energy absorber 1010 further includes a first connector in the vicinity of first end 1120a and a second connector in the vicinity of second end 1120b. In the illustrated embodiment, the first connector includes a passage 1124 formed in the vicinity of first end 1120a, and the second connector includes a passage 1126 formed in the vicinity of second end 1120b.

The length of extension provided by the connectors hereof is determined, at least in part, by the length of the continuous, deformed, energy absorbing section(s) thereof. Moreover, such continuous sections can be deformed and otherwise formed or altered in any manner to absorb energy (in various amounts and profiles—that is, energy absorption as a function of time) when the connector is under a tensile load above or threshold tensile load.

Figure 14B:
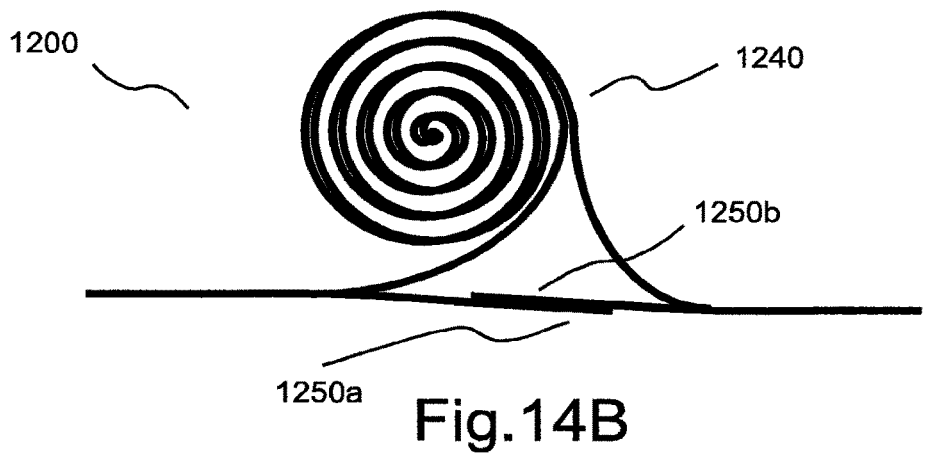
FIG. 14B illustrates a side view of the energy absorber of FIG. 14A wherein at least one continuous section thereof is deformed in a coiled or spiral manner.
Figure 14A:
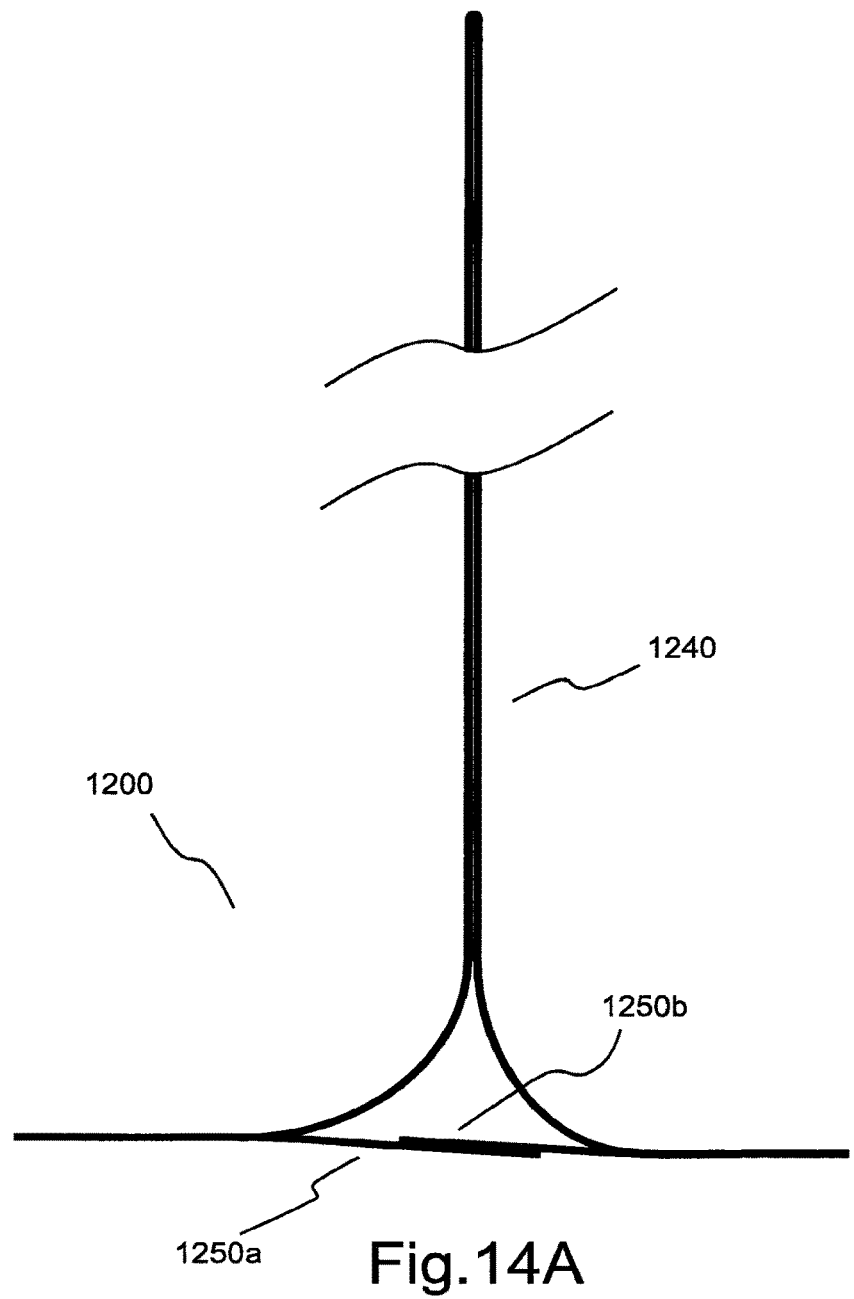
FIG. 14A illustrates a side view of another embodiment of an energy absorber.

For example, FIGS. 14A and 14B illustrates a side view of another embodiment of a connector 1200 which includes at least one continuous section 1240 of increased length as compared to the other connectors described above (thereby providing increased extension upon activation). Continuous section 1240 can, for example, first be deformed in the manner illustrated in FIG. 14A, wherein it is bent upward in the center and the opposing portions are drawn together to be adjacent. As illustrated in FIG. 14B, the adjacent portions of continuous section 1240 can then be coiled or spiraled. As described above in connection with other connectors, connector 1200 includes at least one set of discontinuous sections 1250a and 1250b that are connected as described above to provide a threshold actuation or triggering force. Many other manners of deformation are possible for the continuous sections of the connector hereof (for example, accordion-like deformations, wave-like deformations etc.)

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

The invention claimed is:

1. An energy absorber, comprising:
a monolithic length of a ductile material forming a body having a first end and a second end, the body comprising, in a first configuration, one or more longitudinally extending sections being deformed out of a plane running through the first end and the second end, a first discontinuous section extending longitudinally from the first end toward the second end and being deflected relative to the first end with a distal end portion of the first discontinuous section extending out of the plane in a first direction, and a second discontinuous section extending longitudinally from the second end toward the first end and being deflected relative to the second end with a distal end portion of the second discontinuous section extending out of the plane in a second direction opposite the first direction, the distal end portion of the first discontinuous section abutting the second discontinuous section, the distal end portion of the second discontinuous section abutting the first discontinuous section, the first discontinuous section and the second discontinuous section being breakably coupled such that the first and second discontinuous sections are configured to be decoupled in response to an applied force satisfying a threshold force,
wherein, in an instance in which the applied force satisfies the threshold force, the body is configured to absorb the applied force by transitioning from the first configuration to a second configuration in which the one or more longitudinally extending sections and the first and second discontinuous sections are substantially in line with the plane extending through the first end and the second end of the body.

2. The energy absorber of claim 1, wherein the one or more longitudinally extending sections comprise two longitudinally extending sections, and wherein the first discontinuous section and the second discontinuous section are positioned between the two longitudinally extending sections.

3. The energy absorber of claim 2, wherein each of the two longitudinally extending sections comprises a raised portion forming an outer surface, and the outer surface of each of the two longitudinally extending sections is arranged substantially parallel to the plane.

4. The energy absorber of claim 1, further comprising one or more shear pins, wherein the first discontinuous section and the second discontinuous section each define one or more apertures configured to slidably receive the one or more shear pins, the one or more shear pins configured to shear in the instance in which the applied force satisfies the threshold force.

5. The energy absorber of claim 4, wherein the one or more shear pins comprise a first shear pin and a second shear pin, and
wherein the first discontinuous section and the second discontinuous section each define a first aperture, from the one or more apertures, configured to slidably receive the first shear pin and a second aperture, from the one or more apertures, configured to slidably receive the second shear pin.

6. The energy absorber of claim 5, wherein the first and second apertures defined by the first discontinuous section are substantially aligned with, respectively, the first and second apertures defined by the second discontinuous section when the body is in the first configuration.

7. The energy absorber of claim 1, wherein the body further comprises a first connector passage at the first end of the body and a second connector passage at the second end of the body, wherein the first connector passage is configured to be coupled to a rotatable securing member and the second connector passage is configured to be coupled to a lifeline system or a harness worn by a user.

8. The energy absorber of claim 1, wherein a ratio of an overall width of the body to a thickness of each of the one or more longitudinally extending sections is approximately 18:1.

9. A post system for use in fall protection, comprising:
an extending post member;
a first end member in operative connection with a first end portion of the extending post member;
a second end member in operative connection with a second end portion of the extending post member;
a first connector in operative connection with the first end member to connect the first end member to a structure;
a second connector in operative connection with the second end member to connect a lifeline system to the second connector; and
an energy absorber in operative connection between the first end member and the second end member, the energy absorber comprising a monolithic length of a ductile material, the monolithic length of the ductile material forming a body, the body comprising a first end and a second end, the body defining a first connector passage in the first end and a second connector passage in the second end, the body comprising, in a first configuration, one or more longitudinally extending sections being deformed out of a plane running through the first end and the second end, a first discontinuous section extending longitudinally from the first end toward the second end and being deflected relative to the first end with a distal end portion of the first discontinuous section extending out of the plane in a first direction, and a second discontinuous section extending longitudinally from the second end toward the first end and being deflected relative to the second end with a distal end portion of the second discontinuous section extending out of the plane in a second direction opposite the first direction, the distal end portion of the first discontinuous section abutting the second discontinuous section, the distal end portion of the second discontinuous section abutting the first discontinuous section, the first discontinuous section and the second discontinuous section being breakably coupled such that the first and second discontinuous sections are configured to be decoupled in response to an applied force satisfying a threshold force,
wherein, in an instance in which the applied force satisfies the threshold force, the body is configured to absorb the applied force by transitioning from the first configuration to a second configuration in which the one or more longitudinally extending sections and the first and second discontinuous sections are substantially in line with the plane extending through the first end and the second end of the body, and the extending post member is configured to tilt relative to the first end member.

10. The post system of claim 9, wherein the one or more longitudinally extending sections comprise two longitudinally extending sections, and wherein the first discontinuous section and the second discontinuous section are positioned between the two longitudinally extending sections.

11. The post system of claim 9, wherein each of the one or more longitudinally extending sections comprises a raised portion forming an outer surface, and the outer surface of each of the one or more longitudinally extending sections is arranged substantially parallel to the plane.

12. The post system of claim 9, further comprising one or more shear pins, wherein the first discontinuous section and the second discontinuous section each define one or more apertures configured to slidably receive the one or more shear pins.

13. The post system of claim 12, wherein the one or more shear pins comprise a first shear pin and a second shear pin,
wherein the first discontinuous section and the second discontinuous section each define a first aperture, from the one or more apertures, configured to slidably receive the first shear pin and a second aperture, from the one or more apertures, configured to slidably receive the second shear pin.

14. The post system of claim 13, wherein the first and second apertures defined by the first discontinuous section are substantially aligned with, respectively, the first and second apertures defined by the second discontinuous section when the body is in the first configuration.

15. The post system of claim 9, wherein the first connector passage is configured to be coupled to the first connector and the second connector passage is configured to be coupled to the second connector.

16. The post system of claim 9, wherein a ratio of an overall width of the body to a thickness of each of the one or more longitudinally extending sections is approximately 18:1.

17. A method of forming an energy absorber, the energy absorber having a monolithic length of a ductile material, the monolithic length of the ductile material forming a body, the body comprising a first end and a second end, the method comprising:
forming the body, the body comprising one or more longitudinally extending sections extending continuously between the first end and the second end, a first discontinuous section extending longitudinally from the first end toward the second end, and a second discontinuous section extending longitudinally from the second end toward the first end;
deforming the one or more longitudinally extending sections out of a plane running through the first end and the second end such that the first discontinuous section is deflected relative to the first end with a distal end portion of the first discontinuous section extending out of the plane, the second discontinuous section is deflected relative to the second end with a distal end portion of the second discontinuous section extending out of the plane, the distal end portion of the first discontinuous section abuts the second discontinuous section, and the distal end portion of the second discontinuous section abuts the first discontinuous section; and
connecting the first discontinuous section and the second discontinuous section using a shear pin, such that the energy absorber is configured, upon experiencing an applied force satisfying a threshold force between the first end and the second end, to disconnect the second discontinuous section from the first discontinuous section by shearing the shear pin such that the one or more longitudinally extending sections are thereafter free to deform under the applied force to absorb energy by moving the first end of the body away from the second end of the body as the one or more longitudinally extending sections are displaced toward the plane and the second discontinuous section is spaced apart from the first discontinuous section and becomes substantially coplanar with at least one of the first end and the second end.

18. The method of claim 17, wherein the shear pin is a first shear pin, the energy absorber further comprises a second shear pin, and wherein the first discontinuous section and the second discontinuous section each define a first aperture configured to slidably receive the first shear pin and a second aperture configured to slidably receive the second shear pin, the method further comprising:
retaining the body in a formed configuration by slidably disposing the first shear pin through the first aperture of the first discontinuous section and the first aperture of the second discontinuous section and slidably disposing the second shear pin through the second aperture of the first discontinuous section and the second aperture of the second discontinuous section, wherein in response to the applied force satisfying the threshold force, the first shear pin and the second shear pin are configured to shear to allow the first discontinuous section and the second discontinuous section to space apart longitudinally.

* * * * *